Oct. 24, 1939.　　　V. W. KLIESRATH　　　2,177,491
CLUTCH MECHANISM
Filed Feb. 24, 1932　　　2 Sheets-Sheet 2

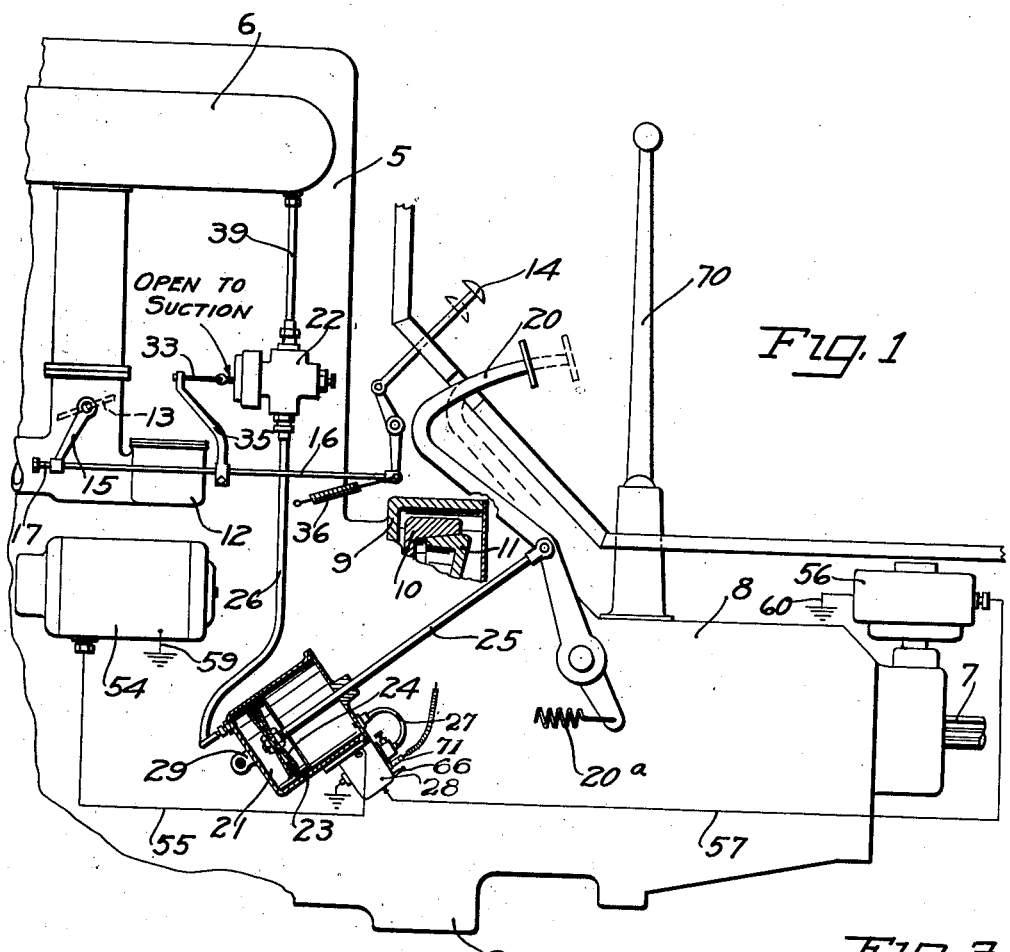

INVENTOR.
VICTOR W. KLIESRATH
BY H.O. Clayton
ATTORNEY

Patented Oct. 24, 1939

2,177,491

UNITED STATES PATENT OFFICE 2,177,491

CLUTCH MECHANISM

Victor W. Kliesrath, South Bend, Ind., assignor to Bendix Aviation Corporation, South Bend, Ind., a corporation of Delaware Application February 24, 1932, Serial No. 594,921

22 Claims. (Cl. 192—.01)

This invention relates to automotive vehicle clutches, and more particularly to control means therefor.

It has heretofore been proposed to employ in connection with automotive vehicles, a power actuating device for engaging and disengaging the clutch, the operation of such device being controlled by the position of the throttle connection of the vehicle engine in such a manner that when the throttle is closed, that is when the engine is running at idling speeds, the clutch is disengaged, while during opening of the throttle, the clutch is engaged. Such an arrangement permits free-wheeling or coasting of the vehicle at the will of the operator, with consequent economy of operation, and at the same time permits of power clutch operation from the throttle control member, thus dispensing with the necessity of manual actuation of the clutch during the customary gear-shifting operation. However, in the operation of devices of the above character, heretofore proposed, due to the fact that engagement of the clutch members is sometimes effected when such members are rotating at widely different speeds, as for example, when the vehicle is coasting at a substantial rate of speed and it is desired to couple the engine with the driven wheels, severe strains and stresses are imparted to the torque-transmitting drive shaft as well as to the clutch members and other rotatable parts associated with the engine, which present in many instances, serious difficulties as well as inefficient and uncomfortable operation of the vehicle.

It is accordingly one of the objects of the present invention to provide a novel mechanism so constructed and arranged as to obviate the above-mentioned difficulties.

Another object of the present invention is to provide a novel actuating mechanism for operating the clutch of an automotive vehicle in such a manner that during operation the cooperating members of the clutch may be engaged only when the speeds of such members are substantially the same, thus effecting smooth and efficient clutch engagement.

Still another object is to provide a novel arrangement of parts employing a suction operated power actuator for the clutch of an automotive vehicle controllable by the position of the engine throttle, together with novel means responsive to the relative speeds of the cooperating members of the clutch for controlling said power actuator, in order to prevent engagement of the clutch members when the speeds of the latter are widely different.

A further object is to provide in a mechanism of the above character, novel electrically operated means actuated by the relative speeds of the co-operating clutch members for controlling the operation of the power actuator whereby clutch engagement is effected only during predetermined conditions of operation of the clutch members.

A further object of the invention is to provide in a mechanism of the type described electrically operated means for controlling the mode of engagement of the clutch when the selective transmission is in high gear, that is when the driven plate of the clutch is directly connected to the drive shaft of the vehicle, said electrically operated means being rendered inoperative, however, in all other gear ratio settings of the transmission.

Yet another object of the invention is to so construct the aforementioned electrical means as to render the same operative for the purpose described when the driven clutch plate is in motion and the engine speed is exceeding a predetermined minimum.

A still further object is to provide a novel arrangement of parts which may be readily applied to existing automotive vehicles in a simple and efficient manner in order to render the latter capable of free-wheeling or coasting at the will of the operator.

Other novel features and advantages of the invention will appear more fully hereinafter from the following detailed description when taken in connection with the accompanying drawings illustrating one form of the invention. It is to be expressly understood, however, that the drawings are for purposes of illustration only and are not designed as a definition of the limits of the invention, reference being had for this purpose to the appended claims.

In the drawings, wherein similar reference characters refer to like parts throughout the several views:

Figure 1 is a diagrammatic view of a portion of an automotive vehicle embodying the present invention;

Figure 2 is an axial section of the electrically controlled valve mechanism associated with the fluid motor shown in Figure 1;

Figure 3 is an axial section of the accelerator controlled valve mechanism;

Figure 5:
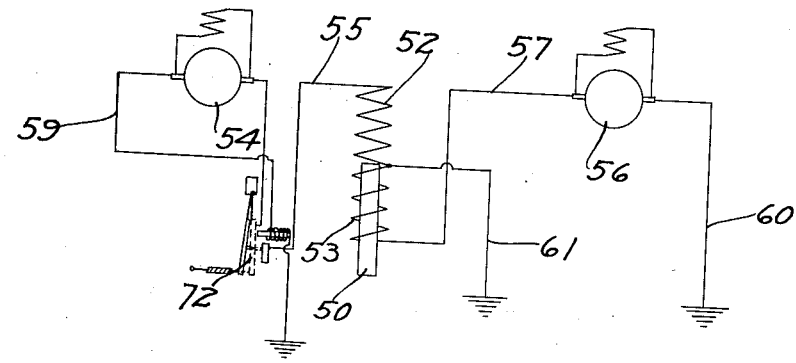
Figure 5 discloses a modified form of wiring diagram effecting a different mode of clutch engagement control.

Referring more particularly to Figure 1, a portion of an automotive vehicle embodying the present invention is disclosed therein as including an internal-combustion engine 5 having a throttle-controlled intake manifold 6, said engine being adapted to be drivably connected with a driven shaft 7 by means of the usual change speed transmission 8, there being provided a clutch 9 comprising driving and driven members 10 and 11, respectively, between the engine and transmission as will be understood by those skilled in the art. A carburetor 12 is provided for supplying a combustible mixture to the engine through the intake manifold, and the amount of such mixture so fed is controlled by suitable throttle connections including a throttle valve 13 and an accelerator pedal 14, the said valve and pedal being interconnected by means of a lever arm 15 secured to the throttle valve, and a link 16 associated with the pedal, there preferably being provided a slight amount of lost motion 17 between these last two named members for a purpose which will appear more fully hereinafter. In order to manually engage and disengage the clutch 9, there is provided a clutch controlling element or pedal member 20, and in accordance with well-known practice, such member is positioned adjacent the usual manually operable vehicle control members, including the accelerator pedal 14, in order to be within easy reach of the operator.

Means are provided by the present invention for securing selective free-wheeling or coasting of the vehicle, and preferably such means are constituted in such a manner as to obviate the necessity of manual operation of the clutch during operation of the selective gear transmission. As shown, such means include a clutch power actuating device or fluid motor 21 operable by a suitable source of fluid pressure, such as for example, by the reduced pressure or partial vacuum present in the intake manifold 6 during operation of the engine 5, the communication between the manifold and the fluid motor being controlled by a valve mechanism 22 operatively connected with the accelerator pedal 14 in such a manner that when the latter is in normal or retracted position the valve will establish communication between the intake manifold and fluid motor to effect clutch disengaging movement of the latter, while when the accelerator pedal is depressed, the valve will cut off such communication and vent the fluid motor to atmosphere, whereupon the clutch will be engaged by means of the usual clutch return spring 20a.

As shown in Figure 1, the clutch power actuator or fluid motor 21 comprises a cylinder 23 having a piston 24 therein, the said piston being operatively connected with the clutch actuating element 20 as by means of a rod 25. One end of the cylinder 23 communicates with the valve mechanism 22 through a suitable flexible conduit 26, while the opposite or compression end of the cylinder is entirely closed with the exception of a connection 27 to a valve mechanism 28, the purpose of which will appear more fully hereinafter. Bracket 29 is preferably secured in any suitable manner to the lower end portion of the cylinder 23 for mounting the fluid motor upon any suitable stationary portion of the vehicle.

For the purpose of selectively controlling communication between the intake manifold and the fluid motor, and between the latter and atmosphere in accordance with the position of the accelerator pedal 14, the valve mechanism 22, heretofore referred to, includes a reciprocating piston valve 30, Figure 3, slidably mounted within a bore 31 of a valve casing 32, the said valve being operatively connected with the link 16 by means of a suitable flexible connection such as a wire cable 33, one end of the latter being connected to the valve operating rod 34 while the other end is secured to one end of an arm 35, rigidly secured to the link 16. Normally, when the accelerator pedal 14 is in fully retracted position and the engine 5 is idling, a spring 36 operatively connected between the link 16 and any suitable stationary portion of the vehicle, is effective to overcome the effect of spring 37, see Figure 3, in order to move valve 30 toward the left, as viewed in this figure, and thus establish communication between the conduit 26 and the intake manifold 6 by means of an annular valve port 38 and conduit 39, the said valve port simultaneously registering with ports 40 and 41. It will thus be seen that during such operation of the valve, the fluid motor is connected to the intake manifold. However, upon manual depression of the accelerator 14, to effect an opening of the throttle valve 13 and hence acceleration of the vehicle, the link 16 and arm 35 are moved to the right, as viewed in Figure 1, whereupon the spring 37 is effective to move the valve to the position shown in Figure 3, thus interrupting communication between the intake manifold and the fluid motor and establishing a communication between the latter and the atmosphere through conduit 26, port 41, bore 31, and a plurality of apertures 42 provided in the casing 32. A cap 43, carried by the end of the valve casing 32, is preferably provided in order to exclude water, dust, etc., from entering the valve mechanism.

Preferably, the valve rod 34 carries at its inner end a sleeve 44 on which the valve 30 is slidably mounted, there being a slight amount of lost motion between said sleeve and valve predetermined by the position of a stop member 45 on one end of the sleeve and a valve member 46 at the other end of the sleeve. An axial bore 47 is provided in the sleeve, normally unobstructed at the right-hand end portion and adapted to be controlled by the valve member 46 at the other end portion, such construction being provided for the purpose of reducing the tendency for the formation of a partial vacuum within the valve casing to the right of the valve 30 when the latter is moved rapidly to the left, such movement being effected by the removal of the foot of the operator from the accelerator pedal when it is desired to operate the clutch control mechanism. A small aperture 48, the degree of opening of which is controlled by an adjustable screw 49, is provided in the end wall of the valve casing in order to prevent any dashpot action of the valve during movement of the latter to the right during acceleration of the engine. From the above construction, it will readily be apparent that when the internal-combustion engine is idling, that is when the accelerator pedal 14 is in normal or retracted position, the valve 30 occupies such a position as to establish communication between conduits 26 and 39 in order to connect the fluid motor with the intake manifold. By reason of the reduction of pressure within the fluid motor below the piston 24, the said piston and clutch actuating element 20 connected therewith will be moved downwardly, as viewed in Figure 1, thereby effecting a disengagement of the clutch members 10 and 11 prior to operation of the transmission, said disengagement also effecting a free-wheeling or coasting of the vehicle. During such downward movement of the piston 24, inwardly opening check valve 49 positioned in the valve structure 28 and adapted to communicate with atmosphere through ports 51 permits entry of air into the cylinder on the upper or compression side of the piston 24 in order to prevent the formation of a partial vacuum therein.

When it is desired to reengage the clutch members in order to utilize the engine as a brake, or to accelerate the vehicle after operation of the change speed gearing of the transmission, it is merely necessary to depress the accelerator pedal a sufficient amount to take up the lost motion at 17, such movement permitting the valve 30 to move to the right, as viewed in Figure 3, to cut off communication between the conduits 26 and 39 and connect the first-named conduit to the atmosphere through ports 42. The pressure within the power actuator or fluid motor 21 below the piston 24 will then be increased to such an extent as to permit upward movement of the piston by means of the clutch return spring 20a to effect engagement of the clutch, provided the compression side or that portion of the cylinder to the right of piston 24 communicates with the atmosphere. It will readily be appreciated that if such an atmospheric connection were provided at all times, engagement of the cooperating clutch members might be effected while the speeds of such members were widely different, thus causing inefficient and uncomfortable operation of the vehicle.

In order therefore to control the compression side of the fluid motor to effect engagement between the clutch members only when the relative speeds of such members are substantially the same, thus obtaining a smooth and efficient transfer of power or energy from one clutch member to the other, electrical means are provided for controlling the operation of the fluid motor in accordance with the relative speeds of the clutch members. As shown, such means are constituted by a suitable electromagnetically operated solenoid valve 50 mounted for reciprocating movement within a bore 51a of the heretofore mentioned valve structure 28, there being provided a pair of differentially wound coils or windings 52 and 53 surrounding the solenoid 50. Winding 52 is adapted to be energized by the usual generator 54 associated with automotive vehicle engines, such generator being illustrated as connected to said winding by means of a connection 55. The winding 53 is adapted to be energized from a generator 56 through a connection 57, the said generator being adapted to be directly driven by the drive shaft 7. The generators 54 and 56 are preferably connected to ground by means of leads 59 and 60 respectively and the two ends of the differentially wound coils 52 and 53 are connected together and to ground as by means of lead 61.

Figure 4:
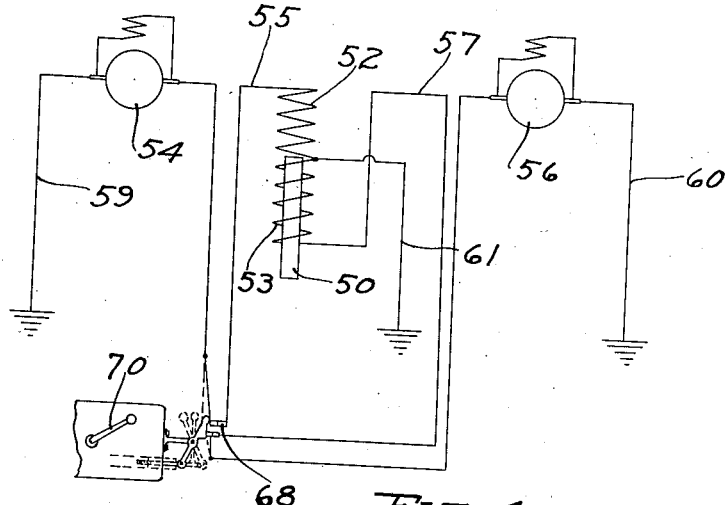
Figure 4 is a schematic wiring diagram illustrating the connections associated with the electrically controlled valve.

It will be obvious from Figure 4 that the coils 52 and 53 are differentially wound and that the connections thereto are such that the current therein flows in opposite directions, thus effecting a substantial neutralization of the flux caused by each coil when the currents therein are substantially equal. Preferably, the characteristics of the generators 54 and 56 and their driving connections to the rotating portions of the vehicle are such as to cause currents of equal value to flow in the respective coils 52 and 53 when the clutch members 10 and 11 are rotating at substantially the same speed. When such conditions occur, that is when the effective flux in the solenoid valve 50 is substantially neutralized, the latter will be moved to the right, Figure 2, by means of the expansive force of spring 62 to establish communication between the compression side of the fluid motor by means of connection 27, a bore 63 within the solenoid valve 50, and ports 64, 65 and adjustable port 66 all leading to atmosphere, thereby permitting a return movement of the piston 24 to effect engagement of the clutch members 10 and 11 when the rotative speeds of such members are substantially the same.

It will be readily apparent from the above construction that when the accelerator pedal is permitted to return to neutral or retracted position, the connection between the intake manifold and the fluid motor is opened, as above described, and the vehicle will free-wheel or coast, it being understood that the piston 24 will be moved toward the left to effect clutch disengaging movement of the clutch control element 20. If it now be desired to engage the clutch in order to employ the engine as a brake, or in order to accelerate the vehicle, it is merely necessary to depress the accelerator pedal 14 to effect movement of the throttle connection 16 and arm 35 toward the right, Figure 1. Under these conditions, it will be appreciated that the winding 53 associated with the generator drivably connected to the driven clutch element will exert an effective pull upon the solenoid valve 50 to cause the latter to be moved to the left as viewed in Figure 2 in order to effect a closure of the ports 64 leading to the atmosphere and notwithstanding the connection between the fluid motor to the left of piston 24 and the atmosphere, the said piston will not move to the right to effect clutch engaging movement of the clutch control element 20, it being observed that all communication between the cylinder to the right of piston 24 and the atmosphere is cut off. However, upon further depression of the accelerator pedal 14, the vehicle engine will be accelerated, until the generator drivably connected therewith reaches a speed sufficient to induce in the differential winding 52 associated therewith, a current of substantially the same value as that present in the winding 53. As soon as such condition arises, the effective fluxes due to the two windings 52 and 53 will neutralize each other and the spring 62 will be effective to move the solenoid valve 50 to the right, as viewed in Figure 2, and thus establish communication between the fluid motor and the atmosphere, thereby permitting movement of the piston 24 to the right and consequent clutch engaging movement of the clutch control element 20.

In some instances, it may be desirable to utilize a small generator, which shall be separate and distinct from the usual vehicle engine driven generator, for operating the solenoid valve 50, in which event it is to be understood that this small generator may be drivably connected through any suitable means with an engine-driven member, provided the arrangement is that hereinabove indicated.

In order to render the above described electrical governor means operative for the purpose described, the same is, in the preferred embodiment disclosed in Figure 4, brought into operation only when the selective transmission is in high gear. To this end a switch 68 is provided within the transmission, operable by the usual shifting lever 70 when the same is moved to place the transmission in high gear, and operative to close both electrical circuits. With the transmission in any one of low, intermediate or reverse gear settings, which might be the case when it is desired to start the vehicle in motion, the governor means is inoperative. With the electrical means heretofore described this is quite necessary inasmuch as with the vehicle static, which, of course, renders the driven clutch plate static, the valve 50 would be automatically operated, to prevent an engagement of the clutch, with the starting of the engine.

With the governor means in operation and the transmission in high gear when free-wheeling a very rapid movement of the driving clutch plate is desired so that the clutch may be engaged before the throttle can be inadvertently opened to again actuate the valve 50. To this end a supplementary valve 71 may be provided, manually operable by a Bowden control from the dash, and which valve when opened serves to permit an efflux of air from the motor in addition to that finding an outlet via the adjustable outlet 66. At all other times, that is with the engagement of the clutch in low, reverse and intermediate gears, the rate of engagement is relatively slow as is desired.

There is diagrammatically disclosed in Figure 5, however, electrical governor means operative with the driven clutch plate in motion and the engine turning over at or above a predetermined minimum speed. To this end there is provided a cut out 72 operative to close the circuit including the winding 52 when and if the R. P. M. of the engine is exceeding a predetermined minimum. Preferably, this minimum is fixed sufficiently above the idling speed to insure the engagement of the clutch at the usual throttle settings employed by the average driver in starting the car in any one of low, reverse or intermediate gears; this minimum must also be of such a value as to permit the closing of the aforementioned circuit with the transmission in intermediate gear and the vehicular speed reasonably low at this time. With the last mentioned electrical hookup the vehicle driven generator 56 is preferably positively driven directly by the driving clutch plate 11 by means of any suitable connections which need not be disclosed.

There is thus provided by the present invention a novel control mechanism for the actuation of a clutch which is so constructed and arranged as to permit engagement of the cooperating members of the clutch only when desired. By providing the electrically-operable means for controlling the operation of the fluid motor in accordance with the rotative speeds of the clutch members or depending upon the speed of the driving member, an unusually simple and efficient mechanism is secured and one which is capable of ready installation upon existing automotive vehicles.

While only one embodiment of the invention has been shown and described herein, it is to be understood that the same is not limited thereto, but may be embodied in various forms as will be understood by those skilled in the art. Reference will therefore be had to the appended claims for a definition of the limits of the invention.

What is claimed is:

1. In combination with a power actuated automotive clutch having driving and driven members, power means for engaging and disengaging said clutch members, and electrically-operated means for preventing clutch engagement operation of said power means when said clutch driving and driven members are rotating relative to each other.

2. In combination with a power actuated automotive clutch having driving and driven members, power means for engaging and disengaging said clutch members and electrically-operated means for preventing clutch engagement operation of said power means when said driven member is rotating and said driving member is rotating at or below a predetermined speed.

3. In combination with a power actuated automotive clutch having driving and driven members, power means for engaging and disengaging said clutch members and electrically-operated means for preventing clutch engagement operation of said power means when said clutch driving member is rotating above a predetermined speed and said driven clutch member is stationary.

4. In an automotive vehicle, a clutch having driving and driven members, a power actuator for engaging and disengaging said clutch members, and means for preventing the engagement of said members by said power actuator when said members are rotating relative to each other, said means including electrically-operable devices responsive to the speeds of said members.

5. In a clutch having driving and driven members, a double ended fluid motor for engaging and disengaging said clutch members, valve means for controlling one end of said motor, additional valve means associated with the other end of said motor, and means associated with said last-named valve means for effecting operation of said motor to engage said clutch members only when said members rotate at substantially the same speed.

6. A clutch having driving and driven members, electrical means responsive to the speeds of said driving and driven members, and means including an electromagnet associated with said electrical means for preventing engagement of said clutch members when the said members rotate relatively to each other.

7. A power actuated automotive clutch comprising driving and driven members, a fluid motor for engaging and disengaging said members, a valve for controlling a source of fluid pressure for one side of said motor, a second valve associated with the other side of said motor, electromagnetic means controlling said second valve, and electrical means exciting said electromagnetic means in accordance with the difference in the speeds of said driving and driven members.

8. An automotive clutch comprising driving and driven members, suction-operated power means for effecting engagement and disengagement of said clutch members, means including a valve for controlling the operation of said power means, and electrical means operable in accordance with the relative speed of said clutch members for controlling the movement of said valve.

9. In combination, a clutch having driving and driven members, actuating means therefor for moving the driven clutch member into and out of engagement with respect to the driving clutch member, and electrically-operated means for preventing movement of said actuating means to clutch engaging position when the rotative speeds of said clutch members are not substantially the same.

10. A power-operated clutch comprising driving and driven members, a fluid motor for engaging and disengaging said members, said motor having a fluid pressure-controlled portion and a compression portion, means for controlling the flow of fluid to said fluid pressure-controlled portion to effect disengagement of said clutch members, and means associated with the compression portion of said motor for preventing operation thereof to effect engagement of the clutch members when the rotative speeds of said members are not substantially the same.

11. In combination with an internal-combustion engine having a throttle-controlled intake manifold, a clutch having driving and driven members, a fluid motor for effecting engagement and disengagement of said clutch members, a conduit for connecting one side of said motor to said intake manifold, a valve in said conduit, throttle-controlled connections for operating said valve, a second valve associated with the other side of said motor, and means for controlling the movement of said second valve to prevent operation of said motor to effect engagement of the clutch members when the rotative speeds of said members are not substantially the same.

12. A power-actuated automotive clutch comprising driving and driven members, a fluid motor for engaging and disengaging said members, a valve for controlling a source of fluid pressure for one side of said motor, and means independent of said valve and including means associated with the other end of said motor for preventing operation of said motor to effect engagement of said clutch members when the rotative speeds of such members are not substantially the same.

13. The combination with an internal-combustion engine having a throttle-controlled intake manifold, of a clutch actuating element, a fluid motor for controlling said element, a connection between said motor and the intake manifold, a valve in said connection operable to connect said motor with the intake manifold to effect clutch disengaging movement of said element and to connect said motor with the atmosphere to effect clutch engaging movement of said element, said valve being operable with the throttle, and means associated with said motor and said clutch members for preventing movement of said motor to effect clutch engaging movement of the clutch members when the rotative speeds of such members are not substantially the same irrespective of the position of said valve.

14. In combination with a clutch having driving and driven members, power means for engaging and disengaging said clutch members, movable control means for said power means, and electrically-operated means for preventing movement of said control means to effect clutch engaging operation of said power means when said clutch driving and driven members are rotating relative to each other.

15. In combination with an internal-combustion engine having a throttle-controlled intake manifold, a clutch having driving and driven members, power means for engaging and disengaging said clutch members, a throttle-controlled means for controlling said power means, and means independent of said throttle-controlled means for preventing operation of said motor to effect engagement of said clutch members when the rotative speeds of such members are not substantially the same.

16. In an automotive vehicle having a clutch comprising driving and driven members, a power actuator for engaging and disengaging said clutch members, movable control means for said power actuator, and means for preventing movement of said control means to cause the engagement of said members by said power actuator when said members are rotating relative to each other, said preventing means including electrically-operable devices responsive to the speeds of said members.

17. In an automotive vehicle having a selective change speed transmission and further having a clutch comprising driving and driven members, a power actuator for engaging and disengaging said clutch members, movable control means for said power actuator and means for preventing movement of said control means to cause the engagement of said members by said power actuator when said members are rotating relative to each other, said preventing means including electrically-operable devices responsive to the speeds of said members and controlled by said transmission mechanism.

18. In an automotive vehicle having a clutch comprising driving and driven members, a power actuator for engaging and disengaging said clutch members, movable control means for said power actuator, and means for preventing movement of said control means to cause the engagement of said members by said power actuator when said members are rotating relative to each other, said preventing means including electrically-operable devices responsive to the speeds of said members, said devices being so constructed as to be rendered operable when the driving clutch plate is moving at a speed above a predetermined minimum and when the driven plate is static.

19. In combination with an automotive clutch having driving and driven elements, power means for controlling the operation of said elements, an electrically operated means operative to permit a clutch engaging operation of said power means when both of the clutch elements are rotating at the same or substantially the same speed and the driving clutch element is rotating at or above a predetermined speed.

20. In combination, a clutch having driving and driven members, actuating means therefor, said actuating means being adapted to move the driven clutch member into and out of engagement with respect to the driving clutch member, movable means for controlling the movements of said actuating means, and electrically operated means for preventing movement of said movable means to effect operation of said actuating means to clutch engaging position when the rotative speeds of said clutch members are not substantially the same.

21. In an automotive vehicle having an internal-combustion engine and a driven shaft, a clutch between said engine and shaft, said clutch including driving and driven members, an accelerator for said engine, means operable by said accelerator for actuating the driven clutch member, and electromagnetic means responsive to the difference in speed of said clutch members for controlling said first-named means.

22. In a clutch having driving and driven members, a pneumatic power actuator for engaging and disengaging said clutch members, movable valve means for controlling the operation of said actuator, and means associated with said valve means permitting movement of the latter for effecting operation of said actuator to engage said clutch members only when said members rotate at substantially the same speed.

VICTOR W. KLIESRATH.